| United States Patent [19]

Meunier

[11] 3,897,485

[45] July 29, 1975

[54] CHOLINE COMPOUNDS
[75] Inventor: Henry Eugene Jean-Marie Meunier, Grenoble, France
[73] Assignee: Laboratoires J. Berthier, Grenoble, France
[22] Filed: June 30, 1971
[21] Appl. No.: 158,549

Related U.S. Application Data
[63] Continuation of Ser. No. 587,413, Oct. 18, 1966, abandoned.

[52] U.S. Cl. ........... 260/501.15; 260/398; 260/540; 424/329
[51] Int. Cl. ............................................. C07c 87/30
[58] Field of Search ............................... 260/501.15

[56] References Cited
FOREIGN PATENTS OR APPLICATIONS
1,443,409   5/1966   France ........................... 260/501.15

Primary Examiner—Joseph E. Evans
Assistant Examiner—G. Breitenstein
Attorney, Agent, or Firm—Mason, Kolehmainen, Rathburn & Wyss

[57] ABSTRACT

Dialkyl acetate salts of choline are disclosed having hepatic protective and regenerative properties as well as being useful in treating liver jaundice, viral hepatitis, cirrhosis and reducing blood cholesterol. A process for the preparation of the compounds is also given.

1 Claim, No Drawings

CHOLINE COMPOUNDS

This application is a continuation of my copending application Ser. No. 587,413, filed Oct. 18, 1966, now abandoned.

This invention relates to novel derivatives of choline. More particularly, this invention relates to salts formed with choline wherein the acid moiety is derived from a dialkyl substituted acetic acid.

The compounds of this invention are characterized by the formula:

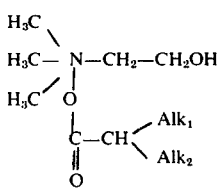

wherein $Alk_1$ and $Alk_2$ are together or individually lower alkyl containing 1–7 carbon atoms inclusive such as methyl; ethyl; iso and n-propyl; as well as the normal, iso, secondary and tertiary isomers of the butyl, pentyl, hexyl and heptyl alkyls.

The compounds of this invention possess hepatic protective and regenerative properties and are useful in treating liver jaundice, viral hepatitis and cirrhosis. The compounds are also effective in reducing the cholesterol level in the blood and are therefore useful in the treatment of various abnormalities of the cardiovascular system such as atherosclerosis.

The novel choline compounds of this invention are preferably prepared by reacting equimolar quantities of a dialkyl acetic acid, corresponding to the previous designation of $Alk_1$ and $Alk_2$, with the choline base in the presence of water, alcohol, or mixtures thereof. The reaction takes place at ambient temperatures and the reaction is quantitative. The desired dialkyl acetate choline salts are obtained as white crystalline, deliquescent powders which are soluble in lower alcohols and insoluble in hydrocarbon solvents. If desired, the choline base can be prepared from choline chloride by treatment with a basic ion exchange resin such as a sulfonated coal or resin to obtain the free base.

The following Example is presented in order to disclose the invention more fully. It should be understood, however, that the invention is not intended to be limited by the ingredients or amounts therein indicated.

EXAMPLE

A solution of 50 gm of choline chloride in 500 ml of water is passed through a column of a Dowex 1 basic ion exchange resin of Dow Chemical Co., to obtain the choline base in solution free of the chloride ion. To the aqueous choline base is added an equal volume of absolute ethanol and a stoichiometric quantity of dipropyl acetic acid. The reaction takes place at ambient temperatures and there is obtained the desired dipropylacetate of choline as a solid white crystalline material which is concentrated under vacuum to dryness at a temperature of 40°–50°C at a yield approximating 100%.

Toxicity tests made in mice by intrapertoneal injection of choline dipropylacetate as prepared in the above Example show an $LD_{50}$ of 512 mg/Kg according to the method of Karber and Behrens. When oral administration of the choline salt is effected in mice an $LD_{50}$ of 513 mg/Kg is established by the same method.

The hepatoprotective action of the compounds of this invention is established by means of the standard bromosulfphthalein (BSP) elimination test conducted in guinea pigs employing intrapertoneal injection of choline dipropylacetate. A dosage of 200 mg/Kg is found to be very effective in eliminating BSP. Further, when the animals are administered carbon tetrachloride in conjunction with the BSP test the hepatoprotective action of the compounds of this invention was established, carbon tetrachloride being a hepatic cell degenerator.

The unexpected properties of the compounds of this invention are shown in comparative tests made between choline hychochloride, dipropyl acetic acid and choline dipropylacetate. The comparative tests are carried out in guinea pigs subjected to hepatic poisoning with carbon tetrachloride. It is found that choline and dipropyl acetic acid have an activity which is identical but that choline dipropylacetate offers protection which is clearly superior.

Jaundice of the liver is effectively treated in humans when choline dipropylacetate is orally administered in a total daily dosage of 1.20 gm equally divided in three doses of 0.40 gm. After 3 days of treatment, the patient showed definite signs of improvement.

Rabbits placed on a hypercholesteremic diet are administered a daily dose of 250 mg/Kg of choline dipropylacetate for a period of 75 days. A marked decline of cholesterol level in the blood is found throughout the test for those animals receiving the dipropylacetate of choline as compared to the control animals which did not receive the choline salt. The liver damage to the control animals is much greater than the animals who received the choline derivative of this invention.

The compounds of this invention, as depicted in the general formula, can be suitably formulated in physiologically acceptable solutions and carriers forming tablets, capsules, syrups, isotonic solutions, injections, suppositories and other dosage forms. The total dosage of 1–2 gm of choline dipropylacetate is found to be effective and well tolerated. However, lower dosages can likewise be employed and can, of course, be adjusted by the attending physician with respect to age, weight and sex of the recipient.

All of the dialkyl acetic acid compounds which are employed in the present invention to form a salt with choline are readily available either from chemical manufacturers or can be prepared according to syntheses described in the literature. To facilitate the availability of the compounds the following references are given: Di-n-propyl acetic acid is a colorless liquid, very slightly soluble in water and its syntheses is described in the literature by E. Oberreit in Berichte, Vol. 29, pages 1998–2001 (1868); 2-isopropyl valeric acid can be prepared by the method of E. Fischer, Holzapfel and Gwinner, Berichte d. Deutschen Chemischen Gesellschaft, Vol. 45, page 256; Di-n-butylacetic acid by the method of Levene and Gretcher as described in the Journal of Biological Chemistry, Vol. 33, page 508; Ethylsec.-butylacetic acid can be prepared by the method of Doran and Shank JACS, Vol. 5, page 195; Ethyl (1-methyl-butyl)acetic acid by the method of Cope and McElvain, JACS Vol. 54, page 4323; and di-hexylacetic acid can be prepared by the method of Armendt and Adams, JACS, Vol. 52, page 1290.

It will thus be seen from the foregoing description of the present invention that there is now provided novel compositions of matter which are useful in effecting hepatic cardiovascular therapy. The present compounds are additionally valuable because they can be administered by several routes without loss of effectiveness. Further, the choline dialkyl acetates provide pharmacological properties which neither choline nor the dialkylacetic acid portions individually can provide.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

I claim:

1. Choline dipropylacetate, having the formula

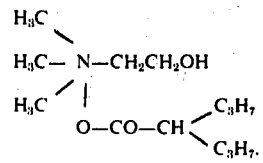

* * * * *